United States Patent

Horowitz

[15] 3,636,822
[45] Jan. 25, 1972

[54] DUAL LINE BRAKE
[72] Inventor: Charles Horowitz, Niles, Ill.
[73] Assignee: The Berg Manufacturing Company, Des Plaines, Ill.
[22] Filed: Apr. 6, 1970
[21] Appl. No.: 25,954

[52] U.S. Cl. ............................................92/63, 92/51, 92/64
[51] Int. Cl. ..............................................F01b 7/20
[58] Field of Search............303/9, 18; 92/63, 64, 65, 51

[56] References Cited

UNITED STATES PATENTS

| | | |
|---|---|---|
| 3,326,090 | 6/1967 | Cruse............................92/64 |
| 3,481,252 | 12/1969 | William........................92/64 |
| 3,502,003 | 3/1970 | Dobrikin......................92/63 |
| 3,182,566 | 5/1965 | Berg et al.....................92/63 |
| 3,090,359 | 5/1963 | Hoppenstand................92/63 |

*Primary Examiner*—Martin P. Schwadron
*Assistant Examiner*—R. H. Lazarus
*Attorney*—Parker, Carter & Markey

[57] ABSTRACT

A vehicle brake actuator having a first movable wall responsive to a first supply of fluid pressure to apply the brakes and a second movable wall responsive to a second, independent supply of fluid pressure to apply the brakes.

4 Claims, 2 Drawing Figures

PATENTED JAN 25 1972 3,636,822

INVENTOR.
Charles Horowitz
BY Parker, Carter & Markey
Attorneys.

DUAL LINE BRAKE

SUMMARY OF THE INVENTION

This invention relates to brake actuators for vehicles and particularly to service and emergency brake actuators.

One purpose of the invention is to provide a brake actuator equally responsive to alternate sources of service pressure for normal brake operation.

Another purpose is to provide a brake actuator normally responsive to either of two independent service sources of fluid pressure and including elements responsive to spring forces to apply the brakes in response to loss of fluid pressure.

Another purpose is to provide a dual brake system incorporating alternate sources of fluid pressure, either of which is automatically operable in the absence of the other, and a single actuator responsive to either of said sources.

Another purpose is to provide a brake actuator of the type described of maximum simplicity and economy in manufacture and use.

Another purpose is to provide a brake actuator and system usable on individual axles and individual wheels.

Other purposes may appear from time to time during the course of the specification and claims.

BRIEF DESCRIPTION OF THE DISCLOSURE

The invention is illustrated more or less diagrammatically in the accompanying drawings wherein.

Like parts are indicated by like numerals throughout the specification and drawings.

DESCRIPTION OF THE PREFERRED EMBODIMENT

Figure 1:
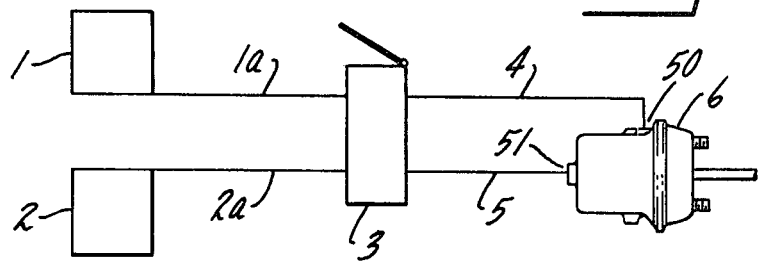
FIG. 1 is a schematic representation of the system of the invention.

Referring now to the drawings, and particularly to FIG. 1, the numerals 1,2 indicate separate protected tanks or reservoirs serving as alternate sources of fluid pressure. It will be understood that the tanks 1,2 are suitably supplied with fluid pressure by appropriate pressure-creating means, such as a compressor or the like, check valves (not shown) being provided to protect each of the tanks against inadvertent loss of pressure therefrom. Conduits 1a,2a communicate the tanks 1,2 respectively, with a dual application valve 3. A suitable such valve is shown and described in U.S. Letters Pat. No. 3,355,223.

Lines 4,5, respectively, communicate the tanks 1,2 through valve 3 to a brake actuator 6.

Actuator 6 includes a housing generally designated by the numeral 10. The housing 10 may be formed of two cup-shaped portions 11,12, the opposed peripheral surfaces of which may be secured together by clamp ring 13. A first movable wall member, such as the diaphragm 14, divides housing 10 intermediate its ends. A pad 15 engages one side of wall 14 and carries brake-actuating rod 16 which extends from pad 15 outwardly through an end wall of the housing 10 for actuation of the brakes. Spring 17 engages said housing end wall and pad 15 to urge rod 16 and wall 14 away from brakes-on position.

A piston or cartridge member 19 is reciprocal in housing 10 on the opposite side of wall 14. Cup-shaped piston member 20 includes an end wall 21 also dividing housing 10 and engaging said opposite side of wall 14. A circumferential wall portion 22 of member 20 extends from wall 21 away from wall 14 and carries adjacent its distal end the seal 23 in sealing engagement with the inner circumferential wall surface of the portion of housing 10 occupied by member 20 in the position shown in FIG. 2. A second seal 24 is carried by housing 10 in engagement with the outer surface of the circumferential surface of the circumferential wall 22 of member 20.

A backplate 25 is held in the open end of member 20 within wall 22 by ring 26, the member 25 carrying seal 27 in sealing engagement with the inner surface of wall 22. A third movable wall or pistonlike structure 30 is reciprocal within the cup-shaped member 20 and carries seal 31 in sealing engagement with the inner surface of circumferential wall 22. Wall or piston 30 carries an elongated extension 32 which passes through a central aperture 33 in wall 21 of member 20, the seal 34 carried by wall 21 engaging the outer surface of extension 32. A pad 35 is carried at the forward end of extension 32 for engagement with said opposite side of wall 14. A rearward extension 36 carried by wall or piston 30 engages an inwardly extending central portion 25a of backplate 25, a seal 37 carried by depression 25a engaging the extension 36 when the parts are in the position shown. Between backplate 25 and wall 30 a spring 38 is positioned and has its opposite ends-engaging wall 30 and plate 25.

Appropriate means may be provided for mechanically drawing wall 30 toward plate 25 to compress spring 38 and thus to release brakes applied by spring 38 and to facilitate removal and replacement of parts without injury to personnel. As shown, a bolt 40 has a head 41 slidably engaging the inner surface 32a of extensions 32 and 36. Wall 32a and head 41 are configured to preclude relative rotation therebetween and preferably are hexagonal. The threaded portion of bolt 40 extends through extension 36 and plate 25 where nut 42 is carried on bolt 40. It will be understood that appropriate tools (not shown) may be supplied for drawing bolt 40 to the rear, or to the left as the parts are shown, with the head 41 abutting the surface 36a within extension 36, to draw the wall 30 toward plate 25.

A first service inlet 50, which may for example be connected to conduit 4, is positioned in housing 10 for delivery of fluid pressure to the opposite side of wall 14 from that engaged by pad 15 and between the walls 14 and 21. A second service inlet 51 is positioned in the rear end wall of housing 10 and may, for example, be connected to conduit 5 for delivery of service fluid pressure between member 20 and said rear wall of housing 10. An emergency fluid pressure inlet 52 is positioned in housing 10 for delivery of fluid pressure to annular recess or groove 53 formed in the inner wall of housing 10.

Wall 22 of member 20 has lateral passage means 55 formed therein and penetrating the outer surface thereof toward the wall of housing part 11. It will be understood that the clearance between wall 22 and the circumferential wall of housing part 11 of the order, for example, of seven thousandths of an inch and is sufficient to permit transmission of fluid pressure from recess or groove 53 to passage 55 when the parts are in the position shown in FIG. 2.

An axially parallel passage area 56 is formed within wall 22 and extends through a substantial portion of the length thereof. At one of its ends, passage area 56 communicates with passage 55 adjacent seal 23 and at its opposite end passage area 56 communicates with a lateral passage 57 communicating passage area 56 with the area within member 20 between walls 21 and 30. Thus fluid pressure delivered through inlet 52 is provided within member 20 to restrain wall 30 and spring 38 and to hold the spring 38 in its compressed, inactive state, as shown in FIG. 2.

Figure 2:
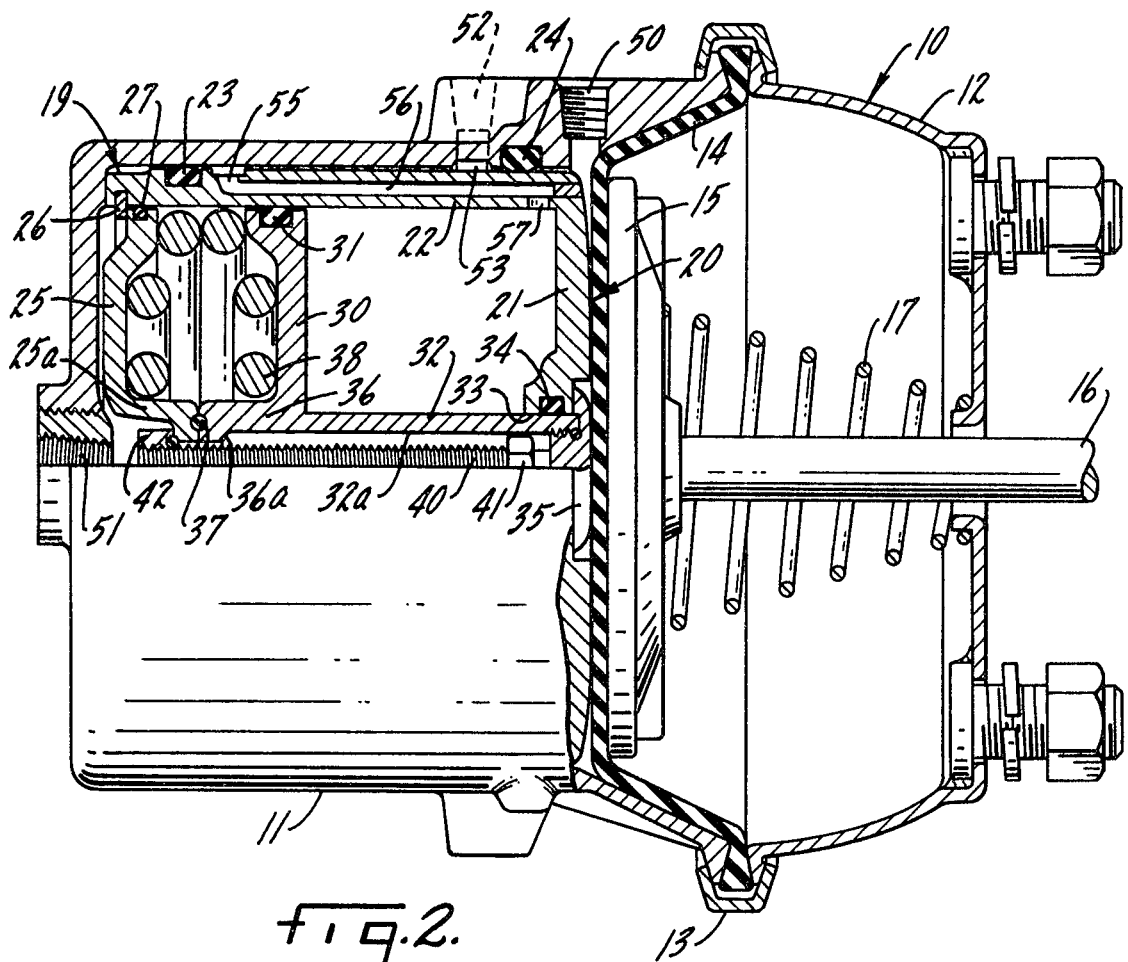
FIG. 2 is a side view in partial cross section of the actuator of the invention.

As may be best seen in FIG. 2, inlet 52 will be in communication with the area in member 20 between walls 21 and 30, through groove 53 and passages 55, 56, 57 at all position of member 20.

The use and operation of the invention are as follows:

Upon operation of application valve 3, fluid pressure at substantially equal levels is delivered simultaneously at service inlets 50, 51. Thus said fluid pressure is delivered to opposite sides of the piston or cartridge member 19, balancing the same and retaining it in the position shown in FIG. 2. At the same time the pressure delivered at inlet 50 produces movement of wall 14, pad 15 and rod 16 toward brakes-on position to actuate the vehicle brakes.

Should fluid pressure fail at inlet 51, the pressure delivered at inlet 50 will be equally effective to retain member 20 in the position shown in FIG. 2 and to apply the brakes as above described.

Should fluid pressure fail at inlet 50, the fluid pressure delivered at inlet 51 will produce movement of the entire cartridge member 19 including elements 20, 21, 22, 23, 25 through 42, 55, 56 and 57 against wall 14 to move pad 15 and rod 16 toward brakes-on position to actuate the brakes precisely as above described.

Emergency fluid pressure may be supplied through conventional, suitable valves, conduits and the like from either or both of sources 1,2, for example, to inlet 52. Such emergency supply may be vented intentionally for application of brakes in parking or emergency situations or automatically in response to breakage or leakage of system components.

Should there be a diminution or failure of fluid pressure at inlet 52, the resulting loss of pressure between walls 21 and 30 releases the force and power of spring 38 which moves wall 30, extension 32 and pad 35 against wall 14 to move the same with pad 15 and rod 16 toward brakes-on position to actuate the brakes. When the vehicle brakes have once thus been actuated by spring 38, the brakes may be released by reinstituting a supply of fluid pressure to inlet 52, the same remaining in communication with the area within member 20 between walls 21 and 30. Resupply of said pressure thus moves wall 30 back to compress the spring 38 and withdraw extension 32. Spring 17 returning the pad 15 and wall 14 to the position shown in FIG. 2 and the brakes are thus released. Should said resupply of fluid pressure at inlet 52 be unavailable, means such as those indicated at 36a, 40, 41 and 42 may be operated mechanically to withdraw wall 30 and extension 32 as described.

The dual line system and actuators of the invention enable placement of actuators 6 on each axle of a multiaxled vehicle and, when desired, an actuator 6, with appropriate braking elements (not shown), on each wheel of such vehicle.

The embodiments of the invention in which an exclusive property or privilege is claimed are defined as follows:

1. A brake actuator including a housing, a first movable wall member in said housing, a hollow piston in said housing and positioned for contact with said first movable wall member, a first fluid pressure inlet positioned in said housing for delivery of fluid pressure between said first wall member and said piston to move said first wall member in a first direction, a second fluid pressure inlet positioned in said housing for delivery of fluid pressure to one side of said piston to move said piston in said first direction, a second movable wall member in said hollow piston and a third fluid pressure inlet positioned in said housing for delivery of fluid pressure to one side of said second wall member and passage means in said piston communicating with third inlet with said second wall member.

2. The structure of claim 1 wherein said hollow piston wall comprises a cup-shaped piston slidable in said housing and having an end wall positioned for engagement with said first movable wall member, said second wall member being movable within said cup-shaped piston and having an extension projecting through said end wall of said cup-shaped piston for engagement with said first movable wall member, a backplate carried in the open end of said cup-shaped piston and spring means engaging said backplate and said second movable wall member to urge said second movable wall member toward said first movable wall member.

3. The structure of claim 1 wherein said passage means is effective to communicate said third inlet with said second wall member at all positions of said piston.

4. A brake actuator including a housing, an actuator rod extending outwardly of said housing for brake actuation, a wall member movable in said housing against said rod to urge said rod toward brakes-on position, a cartridge member movable in said housing and against said wall member to urge said wall member and rod toward brakes-on position, means for substantially simultaneously delivering fluid pressure to one side of said wall member and to the opposite sides of said cartridge member to move said wall member toward brakes-on position and to retain said cartridge member in retracted, inactive position, a movable member dividing and movable within said cartridge member, said movable member having an extension projecting through said cartridge member for contact with said movable wall member, spring means positioned in said cartridge member to move said movable member and extension toward said movable wall member to urge the same toward brakes-on position and additional means for delivery of fluid pressure to one side of said movable member to urge the same against the action of said spring means, said additional means including an inlet formed in said housing and passage means formed in said cartridge member for communication of said inlet with said one side of said movable member at all positions of said cartridge member.

* * * * *